United States Patent [19]

Sullivan

[11] 4,429,568

[45] Feb. 7, 1984

[54] CLOSURE PLUG ASSEMBLY FOR PRESSURE TESTING LIQUID DRAIN AND VENT PLUMBING PIPE SYSTEMS

[76] Inventor: Richard N. Sullivan, 7911 SE. 82nd Ave., Portland, Oreg. 97266

[21] Appl. No.: 373,324

[22] Filed: Apr. 30, 1982

[51] Int. Cl.³ .................................................. G01M 3/04
[52] U.S. Cl. ...................................... 73/49.8; 138/90; 138/93; 138/94
[58] Field of Search .................. 73/40.5 R, 49.1, 49.5, 73/49.6, 49.8; 138/90, 94, 94.3

[56] References Cited

U.S. PATENT DOCUMENTS

| | | | |
|---|---|---|---|
| 2,279,257 | 4/1942 | Svirsky . | |
| 2,299,116 | 10/1942 | Svirsky . | |
| 2,299,434 | 10/1942 | Svirsky . | |
| 3,091,259 | 5/1963 | Alessio | 138/90 |
| 3,154,106 | 10/1964 | Nooy | 138/94 |
| 3,216,456 | 9/1965 | LaVoie | 138/90 |
| 3,241,571 | 3/1966 | Garcia | 138/90 |
| 3,431,946 | 3/1969 | Sawyer | 138/93 |
| 3,457,959 | 7/1969 | Cooper | 138/90 |
| 3,941,156 | 3/1976 | Metzer | 138/90 |
| 4,168,621 | 9/1979 | Kreitzenberg | 73/40 |
| 4,203,473 | 5/1980 | Roberson . | |
| 4,306,447 | 12/1981 | Franks, Jr. | 73/46 |

*Primary Examiner*—S. Clement Swisher
*Attorney, Agent, or Firm*—Eugene D. Farley

[57] ABSTRACT

A closure plug assembly for the pressure testing of liquid drain and vent plumbing systems including a T or Y test section with a test opening comprises a cap sub-assembly, sealing means for releasably securing the cap sub-assembly across the test opening, and a plug such as an inflatable bulb or plate removably insertable in the plumbing system adjacent the test opening for test-damming the flow of liquid upstream therefrom. Link means is connected to the plug for removing the same at the conclusion of the test operation. A valved port in the cap is used for filling the plumbing system with test liquid under pressure during a testing operation.

3 Claims, 6 Drawing Figures

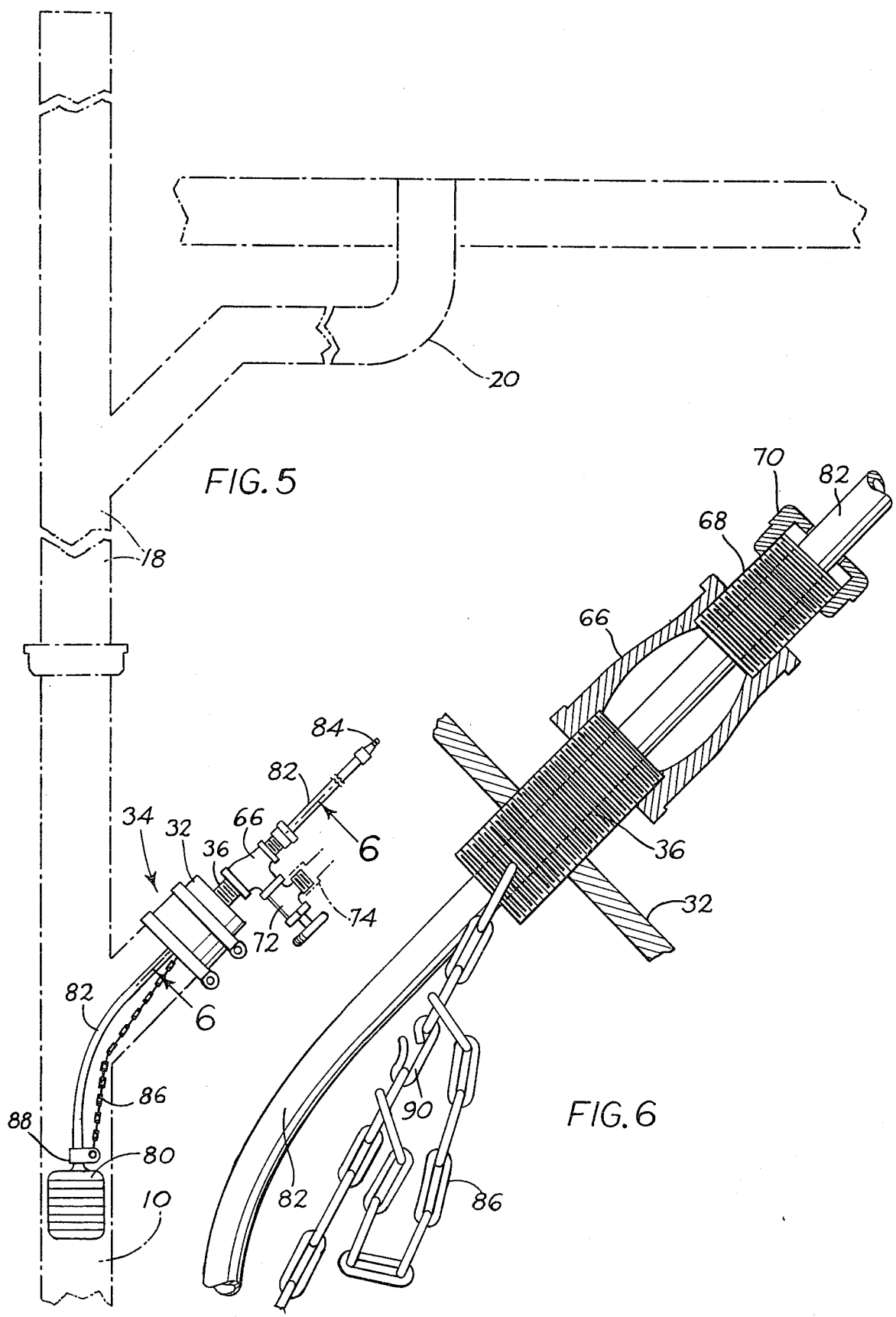

4,429,568

CLOSURE PLUG ASSEMBLY FOR PRESSURE TESTING LIQUID DRAIN AND VENT PLUMBING PIPE SYSTEMS

BACKGROUND AND SUMMARY OF THE INVENTION

This invention relates to closure plug assemblies for the pressure testing of liquid drain and vent plumbing systems, particularly sewer pipe systems including a soil pipe.

During the construction of single and multi-story buildings, the plumbing codes require the plumber to run a pressure test on the installed plumbing lines to make certain that they do not leak. Conventionally, the plumbing line has a Y or T connection adjacent its lower end enabling access for periodic cleaning. Advantage is taken of the access opening thus provided for insertion of the testing apparatus.

Such apparatus comprises a plug which is placed removably in the soil pipe in sealed relation thereto. The pipe above the plug then is filled with water, to a height of 3 or 4 stories in a multi-storied building, and the plumbing inspected for leaks. At the conclusion of the test the plug is rendered inoperative, the system drained, and the plug removed.

The plug employed in the conventional test apparatus normally is a pneumatically inflatable plug, as illustrated in the following U.S. Pat. Nos.: Svirsky 2,279,257, 2,299,116 and 2,299,434; Garcia 3,241,571; Roberson, Sr. 4,203,473.

The prior art test assemblies of the class under consideration are characterized by one or more deficiencies, principal among which is the fact that they are relatively complicated in construction, require especially fabricated parts, and consequently are expensive to manufacture.

Additionally, in many instances they are prone to leak, especially upon draining the tested plumbing system; are relatively difficult to install and remove; in some instances do not serve as a barrier for objects accidentally dropped in the pipe; are slow to fill and drain during the test operation; and, in some instances and under some conditions themselves are prone to be dislodged and accidentally washed down into the sewer.

It is the general purpose of the present invention to provide a closure plug assembly for pressure testing liquid drain and vent plumbing pipe systems which overcomes the foregoing and other problems, and provides a simple, easily applied, efficiently used apparatus for the indicated purpose which can be fabricated simply and inexpensively from readily available components.

Briefly stated, the closure plug assembly characterized by the foregoing advantages comprises a cap sub-assembly and sealing means for releasably securing the cap sub-assembly across a test opening in a T or Y test section of a plumbing system, in sealed relation thereto. Plug means is removably insertable in the plumbing system adjacent the test opening for damming the upstream flow of liquid. Link means is connected to the plug means for removing the same at the conclusion of the testing operation. A valve port is present in the cap sub-assembly for filling the plumbing system with test liquid under pressure during the testing operation and, preferably, for draining it at the conclusion of the test.

DESCRIPTION OF PREFERRED EMBODIMENTS OF THE INVENTION

In the drawings:

FIG. 5 is a foreshortened view in elevation of a plumbing system incorporating the closure plug assembly of the present invention in a second embodiment, and FIG. 6 is a fragmentary sectional view taken along line 6—6 of FIG. 5.

Figure 1:
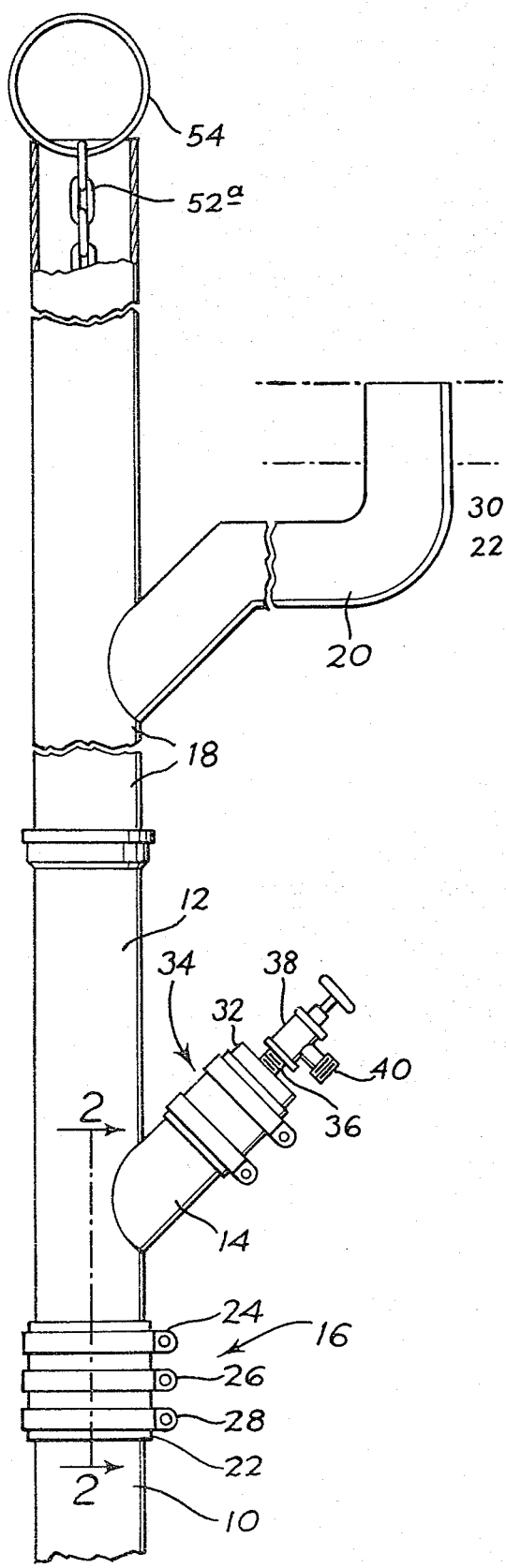
FIG. 1 is a foreshortened view in elevation, partly in section, of the hereindescribed closure plug assembly for the pressure testing of liquid drain and vent plumbing systems in a first embodiment.

As shown in the drawings, the herein described closure plug assembly is illustrated in two principal embodiments. In the embodiment of FIGS. 1-4, the plug or pipe-sealing member of the assembly comprises a plate assembly. In the embodiment of FIGS. 5 and 6, it comprises a pneumatically inflatable bulb.

Considering first the embodiment of FIGS. 1-4:

The closure plug assembly of my invention is designed for use in testing a plumbing system comprising the usual arrangement of liquid drain and vent pipes employed in a single story or multi-story building. As shown, the plumbing system comprises a first length of drain or soil pipe 10, and a test Y or T segment 12 provided with the usual test opening in a laterally extending branch pipe 14.

The Y or T section 12 is located at a low point in the plumbing system and is connected to soil pipe section 10 by means of a conventional "band aid" type coupler indicated generally at 16.

Band aid type coupler 16 comprises a rubber sleeve 22 dimensioned to fit tightly around the joint between the abutting ends of pipe segments 10 and 12. The sleeve is held in place, and sealed, by means of at least two, preferably three, conventional screw band clamps 24, 26, 28. An annular shoulder or flange 30 extends laterally inwardly at the joint between the two pipe sections.

Y or T 12 is plumbed to successive vertical sections 18 and branch lines 20 in the usual manner.

The closure plug assembly employed in this system comprises broadly a cap sub-assembly, sealing means for releasably securing the cap sub-assembly across the test opening in sealed relation thereto, plug means removably insertable in the plumbing system adjacent the test opening for damming the flow of liquid upstream from the test opening, link means connected to the plug means for removing the same at the conclusion of the testing operating and valve port means in the cap sub-assembly for filling the plumbing system with test liquid under pressure during the testing operation as well as for draining the liquid from the system, when desired.

The cap sub-assembly comprises a conventional pipe cap 32 codimensional with the lateral extension of the test Y which it abuts. It is secured in place and sealed by suitable means, for example by means of a second band-aid type coupler indicated generally at 34.

A nipple 36 is threaded into the top of cap 32. A faucet 38 is threaded onto the outer end of the nipple.

The faucet has a threaded connection 40 to which may be coupled a conventional hose for filling and draining the system during testing.

Figure 2:
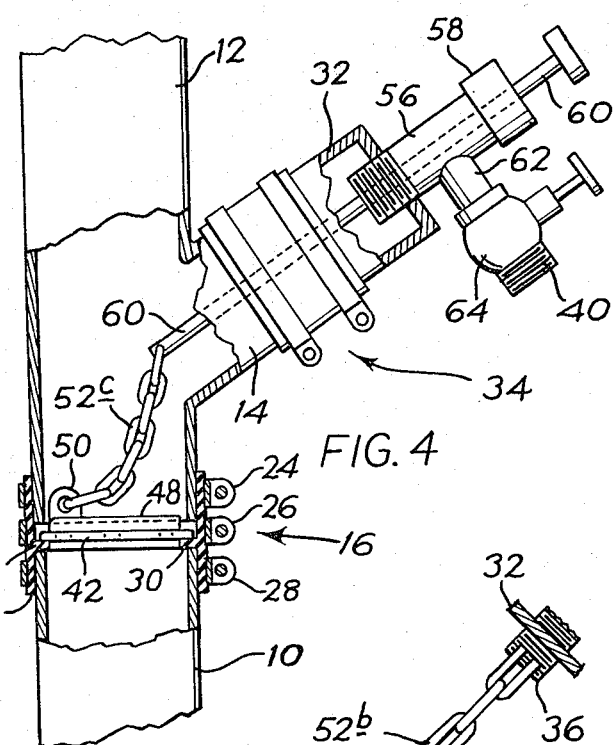
FIG. 2 is a fragmentary view in vertical section taken along line 2—2 of FIG. 1.
Figure 3:
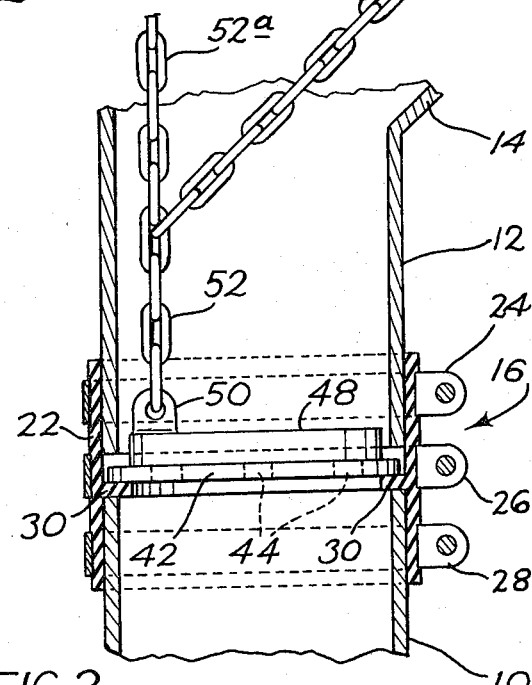
FIG. 3 is a plan view of a perforated plate used in the closure plug assembly of FIGS. 1 and 2.

The plug means employed for damming the flow of liquid upstream from the test opening is illustrated particularly in FIG. 2. It comprises a perforated plate 42 having a plurality of perforations 44. It is sized to span the pipe and bear against the upper surface of shoulder 30 of connector 16. It may be placed during the commencement of the plumbing operation and kept in place during the construction period, during which it serves as a trap for any waste material which might inadvertently be introduced into the plumbing system and which otherwise would tend to clog the system.

An imperforate plate 48 is seated upon perforate plate 42. It preferably is made of rubber or other flexible durable material and is dimensioned to seal off all of perforations 44 in plate 42.

If desired, a single rigid steel plate may be substituted for plates 42, 48. It provides a permanent seal which must be removed manually when desired, as at the conclusion of the construction operation.

Plate 48 is provided with a connector 50 extending upwardly from its upper surface. The connector is coupled to link means by means of which the plug provided by the combination of plates 42, 48 may be operated.

In the form of the invention illustrated in FIG. 2, the link means comprises a chain 52 one segment of which 52a rises vertically to the top of the pipe and terminates in a ring 54 which serves as a stop to prevent the chain from collapsing into the pipe.

A second segment 52b of the chain angles laterally through branch segment 14 of the Y. It is secured to the lower end of nipple 36 which is threaded into cap 32. It will be apparent that by manipulation of either ring 54 or cap 32 imperforate plate 42 may be separated from perforated plate 42 as required to drain the system.

Figure 4:
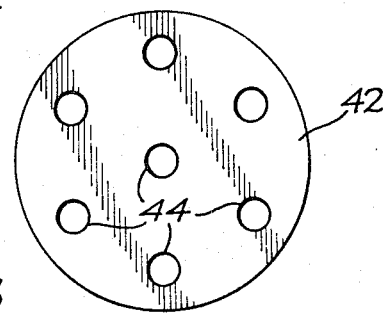
FIG. 4 is a fragmentary view, partly in section, illustrating an alternate form of the closure plug assembly embodiment of FIGS. 1-3.

In the embodiment of FIG. 4, an operating rod is substituted for chain link 52b.

To this end the assembly is provided with a nipple 56 threaded into top cap 32. The outer end of the nipple has a packing nut 58 in which works a rod 60. The inner end of the rod is connected to a length of chain 52c which is coupled to connector 50 of imperforate plate 48 in the manner above described.

A stub length of pipe 62 is threaded into the side of nipple 56. It mounts a faucet 64 which corresponds in design and function to faucet 38 and is employed for draining and filling the test assembly.

In the embodiment of FIGS. 5 and 6, a pneumatically inflated bulb is used as a sealing member, in place of the plate-type sealer of FIGS. 1–4.

As in the embodiment of FIGS. 1–4, in the embodiment of FIGS. 5 and 6 a cap 32 is employed to seal off the access opening of lateral extension 14 of test Y 12. The cap is secured to the lateral extension by means of coupler 34. A nipple 36 is threaded into the top of the cap.

A T 66 is threaded to the outer end of the nipple. It mounts a second nipple 68 with packing nut 70 and a faucet 72 to which a hose 74 may be coupled.

A pneumatically inflatable bulb 80 is dimensioned for insertion into the plumbing system below Y 12. It is connected to a pneumatic tube 82 which extends outwardly through nipple 36, through T 66, through nipple 68, and through packing nut 70. It is provided at its outer end with a fitting 84 by means of which it can be coupled to a source of air under pressure.

Tether means are provided for securing pneumatic bulb 80 so that it cannot be lost into the plumbing system.

The tether means employed comprises a chain 86 the inner end of which is attached to pneumatic tube 82 by means of a clamp 88, and the outer end of which is attached to nipple 36, as shown particularly in FIG. 6. The length of the chain is made adjustable by the inclusion of a special link 90.

OPERATION

In the operation of the embodiment of FIGS. 1–4, perforate plate 42 is seated on shoulder 30 of band-type coupler 22. As noted above, it may be maintained thus in place during the construction operation during which time it prevents debris from falling into the sewer.

When the time comes to test the plumbing system for leaks, imperforate plate 48 is placed on top of perforate plate 42. This may be accomplished by folding it and introducing it through the access opening of the lateral extension of the Y. Chains 52, 52a and 52b are arranged and cap 32 applied by means of band-type coupler 34.

The system above plates 42, 48 then is filled with water through a hose connected to faucet 38 and inspected for leaks. At the conclusion of the inspection, perforate plate 48 is lifted by manipulation of either chain segment 52a or chain segment 52b in order to drain the system. This may be done without spilling water on personnel or finished portions of the building, without danger of losing the plug assembly down the sewer system, and without the necessity of removing perforate plate 42.

The operation of the embodiment of FIG. 5 and 6 is similar.

Pneumatic bulb 80 is inserted in the plumbing system below test Y 12 through the access opening therein. Cap 32 is applied and bulb 80 inflated through pneumatic tube 82. The system above bulb 80 is filled with water from hose 74 coupled to faucet 72.

After inspection for leaks, the above procedure is reversed. The system is drained through faucet 72 and hose 74, pneumatic bulb 80 depressurized, and the apparatus removed from the line by uncoupling cap 32 and removing it through the access opening.

Having thus described my invention in preferred embodiments, I claim:

1. A closure plug assembly for the pressure testing of liquid drain and vent plumbing systems having a Y or T test section with a test opening, the test assembly comprising:
   (a) a cap sub-assembly,
   (b) sealing means for releasably securing the cap sub-assembly across the test opening in sealed relation thereto,
   (c) plug means removably insertable in the plumbing system adjacent the test opening for damming the flow of liquid upstream from the test opening, the plug means comprising a rigid perforate plate insertable in and dimensioned to span the pipe of the plumbing system downstream from the test opening in sealed relation thereto, and an imperforate plate superimposed on the perforate plate and dimensioned to seal the perforations therein, and support means supporting the plates in the pipe,
   (d) link means connected to the imperforate plate for removing the same at the conclusion of the testing operation, and (e) valved port means in the cap sub-assembly for filling the plumbing system with test liquid under pressure during the testing operation.

2. The closure plug assembly of claim 1 wherein the plumbing system downstream from the test opening includes a joint between two pipe lengths and including a clamped sleeve sealing the joint, the sleeve having a laterally extending annular shoulder at the joint between the two pipe lengths, the shoulder providing the support means for supporting the plates.

3. A closure plug assembly for the pressure testing of liquid drain and vent plumbing systems having a Y or T test section with a test opening, the test assembly comprising, (a) a cap sub-assembly, (b) sealing means for releasably securing the cap sub-assembly across the test opening in sealed relation thereto, (c) plug means removably insertable in the plumbing system adjacent the test opening for damming the flow of liquid upstream from the test opening, the plug means comprising a pneumatic inflatable bulb and a pneumatic tube extending through the cap sub-assembly in sealed relation thereto and operably connecting the bulb to a source of air under pressure, (d) tether means interconnecting the bulb and the cap sub-assembly, and (e) valved port means in the cap sub-assembly for filling the plumbing system with test liquid under pressure during the testing operation.

* * * * *